June 7, 1938.  C. A. GUSTAFSON  2,119,578
LAGGING
Filed June 29, 1936  2 Sheets-Sheet 1

INVENTOR
CARL A. GUSTAFSON
BY Charles M. Fryer
ATTORNEY

June 7, 1938.　　C. A. GUSTAFSON　　2,119,578
LAGGING
Filed June 29, 1936　　2 Sheets-Sheet 2
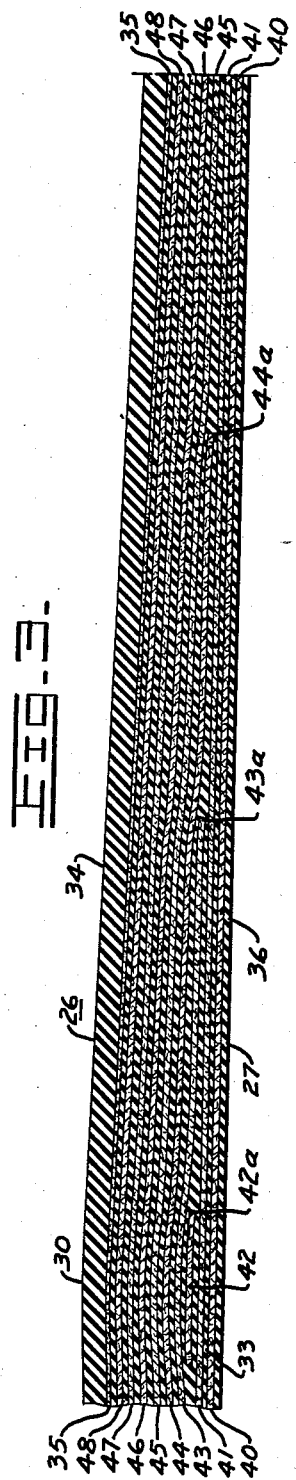
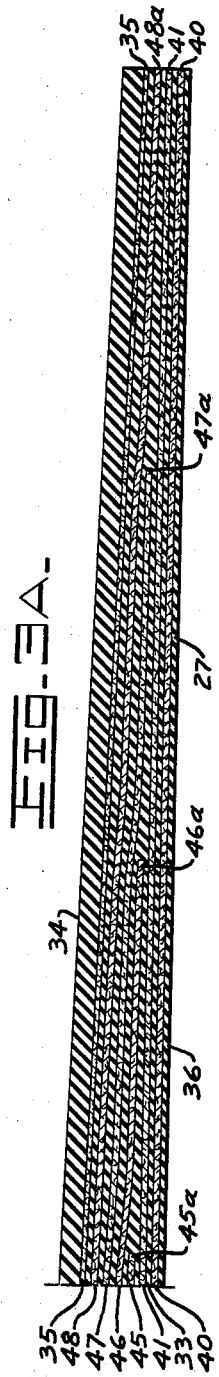
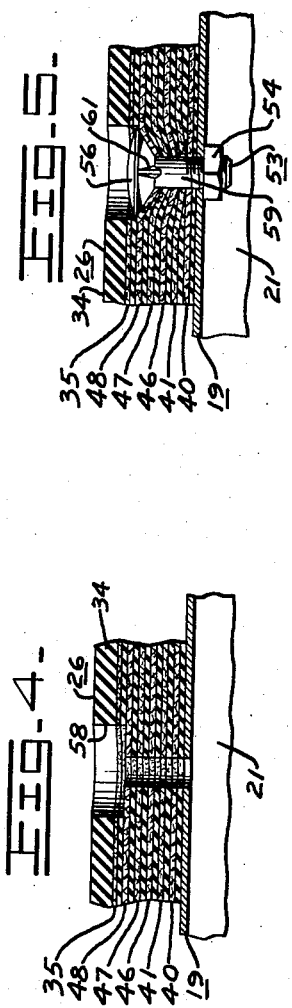
INVENTOR
CARL A. GUSTAFSON
BY Charles M. Fryer
ATTORNEY Patented June 7, 1938

2,119,578

UNITED STATES PATENT OFFICE 2,119,578

LAGGING

Carl A. Gustafson, Peoria, Ill., assignor to Caterpillar Tractor Co., San Leandro, Calif., a corporation of California Application June 29, 1936, Serial No. 87,968

4 Claims. (Cl. 74—230.7)

The present invention relates to a crowned lagging for a drum or pulley construction, which I have found particularly applicable in connection with an elevating grader carrier mechanism wherein a relatively wide carrier belt drum is employed. However, the invention may be utilized to provide a crowned lagging on any pulley or drum about which an endless carrier or belt turns.

In providing pulleys or drums for carrier belts, for example in an elevating grader, it is desirable to employ a crowned portion on the drum or pulley to maintain the belt in proper alignment during the operation of the carrier so as to avoid side slip which is apt to result in damage to the belt and operating parts. Also, it has been found expedient to provide a belt engaging surface on the drum which will increase traction. For the latter purpose, covers or laggings have heretofore been employed for drums or pulleys which are already crowned. However, in the manufacture of drums or pulleys having a crowned portion and provided with a covering or lagging, certain manufacturing difficulties have been encountered. For instance, initially forming the drum or pulley with a crowned portion, especially where it is to be employed in connection with a wide belt, such as a draper belt or carrier belt for an elevating grader, requires certain expensive manufacturing operations. Also the work of securing a cover to the drum shaped with a crowned portion is difficult because a smooth fit is hard to obtain when the cover is applied to a crowned surface.

The invention is designed to eliminate these difficulties, and has as one of its objects among others the provision of an improved:

(1) crowned carrier drum or pulley which is of economical construction;

(2) lagging for a drum or pulley which is of sturdy construction and which obviates the necessity of initially crowning the drum or pulley;

(3) lagging which will supply the necessary crowned portion of the drum or pulley and which can be smoothly fitted thereto;

(4) lagging which can be firmly fastened to the drum or pulley without causing wear to a belt adapted to pass about said drum or pulley, or to the means securing the lagging to the drum;

(5) lagging which is of a construction capable of withstanding tearing or shearing which fastening means passing therethrough tends to cause.

Other objects of the invention will appear as the description progresses.

Generally, the invention comprises the provision of a lagging formed with a flat base for enabling ready assembly on a true cylindrical drum or pulley. The lagging is provided with a central portion of greater thickness than the edges so as to provide a crown for the drum. A preferred form of lagging for accomplishing these results includes a laminated structure consisting of a plurality of fabric plies, some of which extend the full width of the lagging, and others of which extend less than the full width, said plies being arranged to provide a greater ply thickness at the central section of the laminated portion than at its edges, to thus provide the crown. The fabric plies are cemented together by means of a rubber or gum filler. Disposed over these plies is a rubber cover of substantially uniform thickness from edge to edge of the lagging, and which is adapted to receive a means for firmly holding the lagging against the drum.

Referring to the drawings:

Figs. 3 and 3A show a transverse section through one-half of the lagging, Fig. 3 illustrating the portion adjacent the lagging crown and Fig. 3A being a continuation of Fig. 3. In these figures the thickness of the lagging with reference to its transverse width is enlarged for the purposes of clearly illustrating the construction.

Fig. 4 is a transverse cross-sectional view through a section of the lagging and drum taken along the line 4—4, Fig. 2; the fastening means for securing the lagging to the drum being omitted for purposes of clarity.

Fig. 5 is a view similar to Fig. 4, illustrating the manner of fastening the lagging to the drum.

Figure 1:
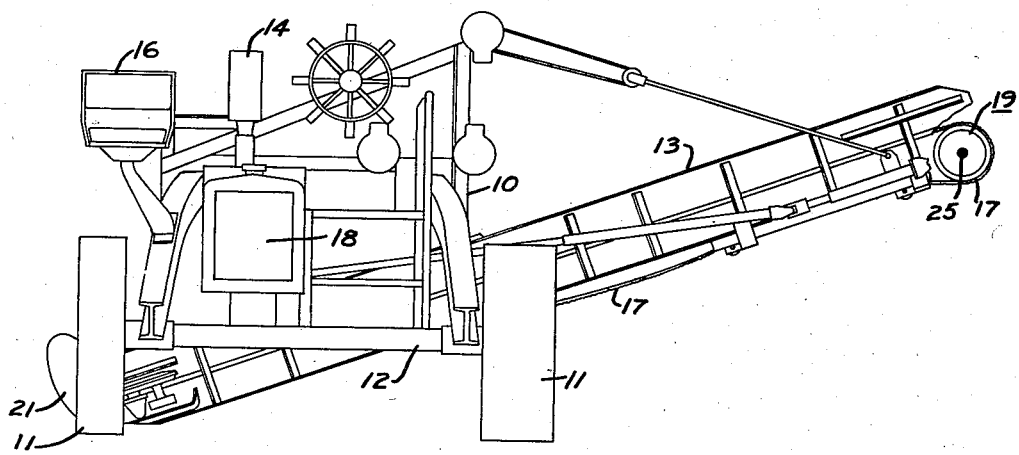
Fig. 1 is a schematic representation of an elevating grader in which a carrier drum made in accordance with my invention is adapted to be employed.

In Fig. 1 of the drawings, the carrier drum is shown as being embodied in an elevating grader which includes a frame 10 having rear supports 11 connected by suitable axle 12. The front end of the frame 10 is supported on a suitable front wheel and axle assembly, not shown, which has a connection for attachment to a draft vehicle such as a tractor. Supported in the grader frame is a carrier 13 comprising upper and lower sections pivotally connected together, adjustably supported by conventional means from the frame of the machine and operated through power control box 14 adjacent operator's station 16. Mounted on the carrier is an endless carrier belt 17 driven directly from engine 18 through suitable power take-off mechanism which has a drive connection with driving drum 19 over which the belt passes. The belt 17 is adapted to receive material from an earth-engaging tool such as the plow 21, and to carry it over the driving drum 19 to a desired location.

Figure 2:
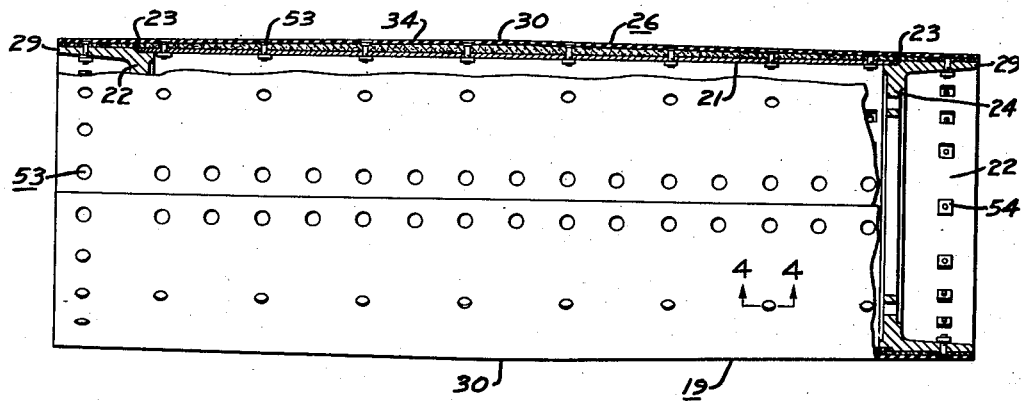
Fig. 2 is a longitudinal view of the carrier drum, parts being broken away to show the lagging secured thereto.

The driving drum 19, as illustrated in Fig. 2, is of substantially true cylindrical construction, that is, the diameter of the drum is substantially the same throughout. The driving drum includes central cylindrical portion 21 which need not be subjected to a special shaping process in order to provide a crown portion. This portion 21 is secured at its ends to drum heads 22 preferably by means of welding, as at 23. Each drum head is provided with an inner annular flange 24 which is adapted to receive and be secured to a shaft 25 (Fig. 1) supported on the carrier frame and connected with a drive connection for driving the drum 19. As pointed out heretofore, elimination of the crown portion on this peripheral surface enables quicker and cheaper manufacturing and assembling operations. It will also be seen that because of the substantially true cylindrical surface on the driving drum, it becomes a relatively easy matter to secure a lagging 26 thereto to provide a smooth fit.

This simplicity of assembly of the drum and ease of attachment of the lagging is made possible by providing or forming the lagging, instead of the drum, with a crowned portion; and, since the construction of the lagging provides not only a traction surface but a crown portion for the drum 19, the improved manufacturing operations heretofore mentioned are accomplished. As illustrated in Figs. 3 and 3A, this lagging is provided with a flat base 27 which is adapted to fit against the cylindrical surface of the drum and to extend to the edges 29 of the drum heads 22, and a crown portion 30, the crown gradually tapering toward the edges 29 so as to maintain in alignment the belt 17 which passes over it.

To build up this crown portion 30, laminations of fabric plies cemented together by gum filler or rubber cement as indicated at 33, have been employed. Certain of these fabric plies extend transversely across the full width of the lagging and other of these fabric plies are stepped-off or are of lesser transverse width than the first mentioned plies so as to form a ply thickness greater at the center than at the edges of the lagging. The top or belt engaging surface of the lagging is formed of a cover portion 34 of substantially uniform thickness. This cover portion is shown as being preferably formed of rubber to provide traction for the belt, and this rubber cover 34 has cemented to its underside a breaker strip 35 which serves to reinforce the rubber. Such breaker strip is preferably formed of loosely woven fabric. On the underside of base 27 of the lagging, a thin coating or layer of gum or rubber 36 similar to the gum filler 33 employed between the plies is provided. The fabric used to provide the plies is preferably a hard woven fabric such as silver duck, and it has been found that a material of this type having a weight of thirty-three ounces per square yard is satisfactory.

The preferred arrangement disclosed in Figs. 3 and 3A, has its laminations of fabric plies and gum filler or rubber cement arranged as follows. Extending for the full width of the lagging and adjacent the base portion 27 are two fabric plies 40 and 41 cemented together by a gum filler. Substantially intermediate the edges of the lagging and disposed above these plies 40 and 41 is a narrow floating ply 42, or ply extending for less than the full width of the lagging. Immediately above this narrow ply 42 and overlying its end portions 42a is another wider floating ply 43 which has its end portions 43a in substantially the same plane as ply 42. Disposed over floating ply 43 is another, still wider floating ply 44 which overlies the end portions 43a and has its end portions 44a in substantially the same plane as ply 42. Three additional floating plies 45, 46 and 47 have been shown in the drawings as disposed over ply 44. Ply 45 is wider than ply 44, and overlies end portions 44a so that its end portions 45a are in the same plane as ply 42. Plies 46 and 47 are each of increased transverse width, and each has end portions 46a and 47a overlying the end portions of the ply directly beneath them so that these end portions are in the plane of ply 42. Above ply 47 is another ply 48 which extends across the full width of the lagging and also has its end portions 48a in approximately the same plane as ply 42. These laminations of floating plies of different widths together with the underlying ply or layers 40 and 41 extending to full width of the lagging, and top-ply or layer 48, also extending the full width of the lagging, provide a firm base for the lagging securing means as will be described hereinafter, as well as provide a reinforced crown lagging having desirable traction providing characteristics.

Although in the preferred embodiment of this invention, six floating plies, or plies extending for less than the full width of the lagging have been employed, this ply structure can be built up of a greater or lesser number of floating plies. It will be noted that as plies are added to the laminated ply portion, the jags or bends occurring as one ply overlies the end of another ply become less marked, so that ply 48 is substantially parallel with the upper surface of the lagging. All of the fabric plies are cemented together by means of rubber cement or gum filler 33. By virtue of arranging the floating plies 42, 43, 44, 45, 46 and 47, in differing transverse widths, the longer ply in each instance overlying the shorter ply, there is provided a laminated fabric structure having its greatest thickness adjacent the center of the lagging and with a gradual taper toward the edges of the lagging. This greater central thickness provides the crown portion 30 of the lagging since the rubber cover 34, including its associated breaker strip 35, is of substantially uniform thickness. Any suitable method may be employed for producing the structure described. For example, the lagging may be built up as illustrated with the layers of rubber cement or gum in between the fabric layers, and the entire mass with the cover 34 in place vulcanized together.

The substantially uniform thickness of the rubber cover 34 enables the lagging to be readily attached to the drum and the provision of the laminated fabric ply structure beneath the cover 34 enables a firm grip to be provided for the lagging. Furthermore, wear of both the belt 17 adapted to pass over the lagging and the means for holding the lagging in place are obviated. As indicated in Fig. 2, it is desirable to provide a large number of fastening means or bolts 53 for securing the lagging so that it will be held against the drum 19 at all times. In assembling the lagging 26 on the drum 19, the lagging is provided with apertures corresponding with similar apertures on the drum 19, each adapted to receive a fastening bolt 53 which holds the lagging against the drum by means of a suitable nut 54. These apertures may be punched or counterbored in any suitable manner, but it is desirable when employing fastening means such as the bolt 53 to countersink the head 56 thereof so that the belt passing over the lagging does not come in contact with the head with consequent wear both to head and belt. The following has been found a preferred way in which to prepare the lagging for assembly. Because of the substantially uniform thickness of the rubber cover 34 and the reinforcing breaker strip 35 secured thereto, counterboring through the cover can be readily effected to provide countersinking for the bolt heads 56. Such counterboring may be effected by means of a hollow drill having a depth gauge, which shears the rubber cover 34 to provide each recess or aperture 58 for accommodating one of bolt heads 56. As shown in Fig. 4, such aperture or recess 58, extends entirely through the solid rubber cover 34. The hole or aperture for the shank 59 of each bolt is formed entirely through the laminations or layers of the fabric and rubber; the recess 58 being of larger diameter than the hole for the shank 59. When the lagging is assembled on the drum, the countersunk head 56 of the bolt is pulled down against the uppermost fabric ply 48 by means of the nut 54; and because of the laminated fabric portion a firm grip is provided for said head, as shown in Fig. 5. To enhance such grip, the head is formed with wings 61 which frictionally engage the fabric. In this way the lagging is not only tightly held down against the drum but the countersunk bolt head 56 does not contact and consequently does not wear nor is it worn by the belt 17 passing over the lagging.

Furthermore, it will be observed that head 56 does not grip or seat in the rubber cover 34. Consequently, no tearing of such cover will occur which might otherwise be the case if a solid rubber lagging were employed; and at the same time, the rubber cover 34 provides the desirable friction and wear surface for engagement with the belt or carrier. It is thus seen that I have provided a construction which produces the effect of a solid rubber lagging but which is stronger and more durable. Such construction can, therefore, be considered as consisting essentially of a rubber structure reinforced by fabric layers or plies to provide a lagging having the desirable advantages of all or solid rubber lagging, together with increased strength.

I, therefore, claim as my invention:

1. As an article of manufacture, an independently fabricated lagging for a pulley or the like, comprising a plurality of laminations of substantially the width of said pulley, a plurality of laminations of lesser and differing widths interposed between said first mentioned laminations to provide a crown on said lagging, all of the aforementioned laminations being cemented together into an integral body, adapted for mounting on said pulley.

2. As an article of manufacture, a flexible pulley lagging of substantially uniform width in the form of a strip of material adapted to be secured around a pulley and preformed to provide the crown for the pulley when secured thereto, comprising a laminated structure of fabric plies cemented together and containing an underlying ply and an overlying ply both extending the full width of the lagging between which underlying and overlying plies are intermediate plies of lesser and differing widths to thereby form said crown, said underlying and overlying plies being adhesively connected at their side edges to enclose said intermediate plies.

3. As an article of manufacture, a flexible pulley lagging of substantially uniform width in the form of a strip of material adapted to be secured around a pulley and preformed to provide the crown for the pulley when secured thereto, comprising a laminated structure of fabric plies cemented together and containing an underlying ply and an overlying ply both extending the full width of the lagging and adhesively connected at their side edges, and intermediate plies of lesser and differing widths enclosed between said underlying and overlying plies to thereby form said crown, said structure being also preformed with apertures for the reception of fastening members to secure said lagging to the pulley.

4. As an article of manufacture, a flexible pulley lagging in the form of a strip of material adapted to be secured around a pulley and preformed to provide the crown for the pulley when secured thereto, comprising a laminated structure of fabric plies cemented together and containing intermediate plies of differing widths to form said crown, and an underlying ply and an overlying ply each of greater width having their side edges adhesively connected to enclose said intermediate plies.

CARL A. GUSTAFSON.